May 6, 1941.   R. D. CLEMSON   2,240,924
MOWER
Filed April 11, 1939
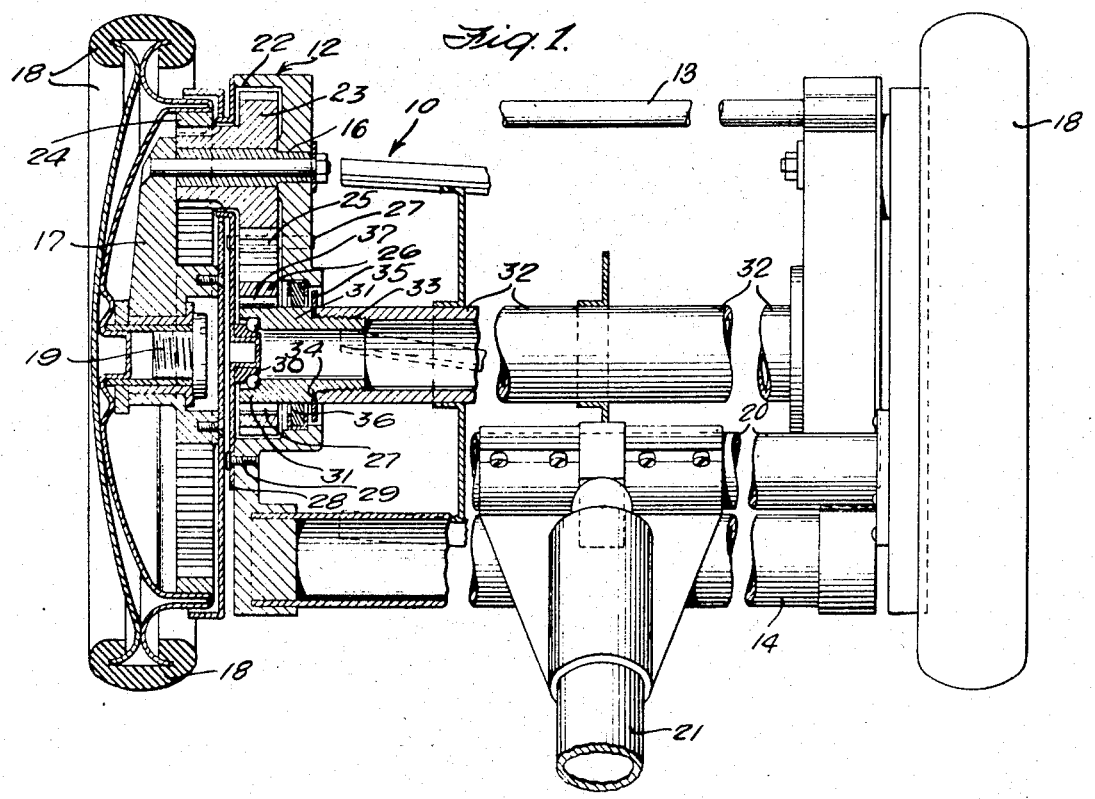
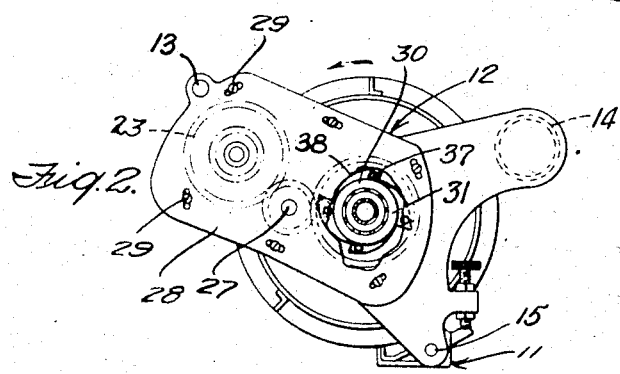
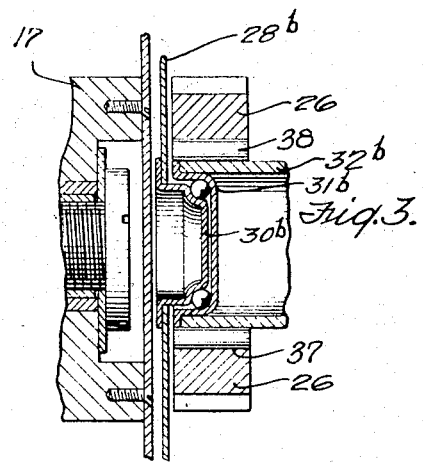
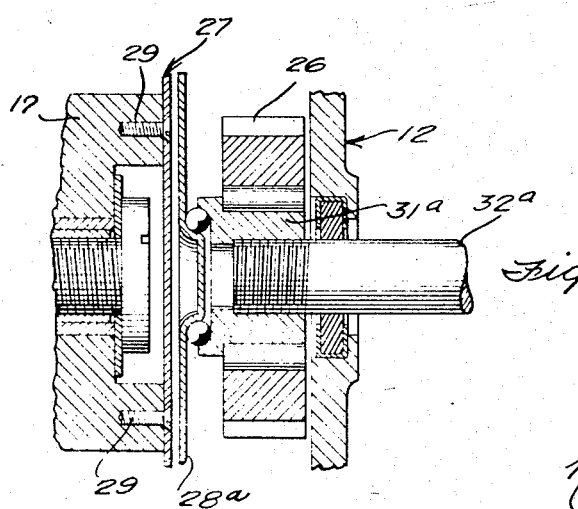
INVENTOR
RICHARD D. CLEMSON
ATTORNEYS Patented May 6, 1941

2,240,924

UNITED STATES PATENT OFFICE 2,240,924

MOWER

Richard D. Clemson, Middletown, N. Y., assignor to Clemson Bros., Inc., Middletown, N. Y., a corporation of New York Application April 11, 1939, Serial No. 267,226

7 Claims. (Cl. 56—253)

This invention relates to rotary reel mowers and more particularly to mounting and adjustment of the reel in such mowers.

Prior to my invention it has been general practice to mount the reel of a rotary reel type mower on a radial type bearing by which its axis of rotation is substantially rigidly fixed. It has been suggested in some few cases to provide means for adjusting the position of such bearing in order in this manner to regulate the relation and particularly the alignment of the reel with the bed knife; but, even in such case it is customary when the adjustment has been made to rigidly fix the position of the bearing and thereby of the axis of rotation. It is natural that this should have been the case, since the forces to which the reel is subjected in use, except for a slight end thrust due to the spiral formation of the blades, are almost entirely radial. Nevertheless, in spite of the relatively simple force to which the bearings are subjected, their service is very severe because of the impossibility in prior practice of keeping them free from moisture and grit which creeps along the shaft and into the bearing. The result of this is a rapid wear in the bearing which introduces objectionable play and impairs the proper operation of the mower as a whole.

Another difficulty which is more fully discussed in my prior copending applications Serial No. 148,836, filed June 18, 1937 and Serial No. 267,225, filed April 11, 1939, which is responsible for much of the impairment of operation of mowers of the rotary reel type, is the inability of the fly knives of the reel to withstand impact to which they are subjected when a stone or nail or other hard obstruction comes into the path of the rotating reel.

I have now discovered that these difficulties which have been experienced in the prior art can to a very large extent be overcome, and at the same time the cost of construction as compared with high quality mowers known to the prior art may be substantially reduced without any sacrifice in quality, by a simple improvement in the mounting of the reel as more fully set forth in the following specification.

It is, therefore, one object of my invention to provide a mower which will be less expensive to construct than quality mowers known to the prior art, but which may be constructed and adjusted with greater precision and will have a longer useful life without requiring repairs, readjustment or regrinding.

Another object of the invention is to provide a simple and inexpensive mounting for the reel in a rotary reel type mower which may be readily adjusted to a desired axial position of the reel.

Another object of the invention is to provide such an adjustment in which the proper meshing between the drive gears for the reel is automatically maintained during the adjustment.

Another object of the invention is to provide a mounting for the reel which is capable of yielding resiliently to absorb shocks resulting from impact of the fly knives against hard obstructions.

Another object of the invention is to make possible the use of less expensive types of bearing with results which are better than those heretofore obtained with the most expensive precision bearings.

Other objects and advantages of my invention will be apparent to those skilled in the art from the following specification and the accompanying drawing.

In this drawing and the following specification I have shown and described a preferred embodiment of my invention and various modifications thereof. These are not intended to be exhaustive nor limiting of the invention, but on the contrary are chosen for the purposes of illustrating the invention and instructing others in the principles thereof and the best manner of applying the same in practical use, so fully that others skilled in the art may be enabled to embody and use the invention in numerous forms and with numerous modifications, each as may be best adapted to the conditions of a particular use.

In this drawing:

Fig. 1 is a view partly in section and partly in plan view with the center portion broken away showing a mower embodying my invention;

Fig. 2 is an end view of the cutter unit of the mower shown in Fig. 1, with the wheels and carriage unit removed and with a part of the cover of the gear housing broken away;

Fig. 3 is a fragmentary sectional view showing a modified form of the invention; and Fig. 4 is a fragmentary sectional view showing another modification of the invention.

Referring first to Figs. 1 and 2, the mower there shown is of the type more fully described and claimed in my copending applications, Serial No. 258,362, filed February 25, 1939, and No. 267,227, filed April 11, 1939, and embodies also inventions claimed in those applications which may be used with advantage but are not essential to my present invention.

The reel 10 and bed knife 11 are mounted in a separate secondary frame consisting of the side frame members 12 and the cross members 13 and 14 and the bed knife 11, with the clamping rod 15 which when suitably assembled constitute a self-contained and substantially rigid cutter unit which is pivoted as a whole upon the pins or axles 16 on the primary side frame 17.

These primary side frames 17 also carry the wheels 18 on stub-axles 19, and are themselves connected together by a cross bar 20 as well as by the cutter unit through the pivot bolts or pins 16. The handle 21 is, in this case, connected to the cross bar 20 but may, of course, be directly connected to the side frames or otherwise as is convenient.

The side frames 12 are formed with a recess 22 in which is mounted the drive gear-train which includes the double pinion 23 coaxial with the pivot 16 and adapted to mesh both with the ring gear 24 on the wheel and with the intermediate gear 25 which constitutes the second gear of the train and which in its turn drives the third gear 26 on the reel shaft.

The intermediate gear 25 is mounted on a pivot 27 rigidly secured in the side frame 12 and projecting through the cover 28 over the housing 22. The cover is fitted substantially accurately to the pivot 27, but is made with substantial clearance with respect to the part of the gear 23 which projects through it and with respect to the clamping screws 29 by which it is rigidly secured in any given position. This permits a limited adjustment of the cover in an arcuate direction about the axis of the pivot 27 and in this way the axial position of the reel may be raised or lowered at either end with respect to the bed knife while accurately maintaining the proper meshing between the gears 25 and 26. This adjustment may be self-established, for example, by loosening the clamping screws 29 at both ends of the cutter unit after all parts are assembled and with the reel turned so that it contacts the bed knife near both ends of the bed knife. With the cutter unit horizontally placed and the bed knife at the bottom, the force of gravity will hold the cutter unit in proper alignment with respect to the bed knife; and in this position, therefore, the screws 29 may be set down tight and proper alignment thus automatically secured.

The cover 28 is stamped inwardly as shown adjacent the end of the reel and onto this portion is secured a hardened member 30 which constitutes one part of the bearing on which the reel is mounted. In this case the bearing is shown as a cup and cone type ball-bearing, but it will be understood, of course, that other types of bearings may be used. I refer to these various types of bearings in which an axial adjustment of the bearing parts gives a tighter or looser fit as "angular contact bearings," that term having come into use particularly in connection with ball-bearings in which the line through the points of contact for such a bearing is at an angle both to the axis and the radius of the bearing, but without thereby limiting its meaning or application to ball-bearings. In this specification I will refer also to rolling members in the bearing as "rollers" without regard to whether these are spherical balls or other types of rolling elements.

In the example shown a hardened cup member 31 is fitted into the end of the tubular shaft portion 32 and thus forms the end of the reel shaft. In the case illustrated the member is formed with a threaded portion 33 which is slightly tapered and adapted to cut its own thread into the inside of the softer tubular shaft 32, the thread in the members at opposite ends of the shaft being right and left hand respectively so that in each case the driving torque tends to tighten the shoulder 34 against the ends of the tubular shaft and thus to make a secure driving engagement.

Washers 35, e. g., of compressed fiber, may be engaged between the shoulders 34 of the members 31 and the ends of the shaft 32 so as to serve as a barrier against moisture and dust which otherwise might creep along the shaft into the housing; and preferably a felt washer 36 is also used to seal the housing for the same purpose.

The outside of the member 31 is preferably polished to a smooth surface which cooperates with the inside of the gear 26, and through the agency of the rollers 37, to form a silent overrunning clutch. With the torque applied to the gear 26 in one direction the rollers 37 are crowded into the narrow ends of tapering slots 38 of the gear 26 and the torque is thus transmitted through the member 31 and the hollow shaft portion 32 to the reel 10. If the wheels are reversed the rollers 37 move to the opposite larger end of the slots 38 and serve merely as roller bearings on which the gear 26 quietly rolls in a direction opposite to the rotation of the reel. In the end of the member 31 as already mentioned above, a bearing surface is formed which in this case constitutes the cup or female portion of the race for the ball-bearing on which the reel is mounted.

The cover 28 on the housing 22 is formed of resilient sheet metal; and the inwardly punched portion and the hardened bearing member 30 are dimensioned so that, when the clamping screws 29 are set down, the cover 28 is sprung so that it exerts a resilient pressure axially towards the reel. This axial pressure assures the proper alignment of the bearing portions and the positioning for proper operation of the reel, and furthermore, gives an automatic adjustment for wear. This permits, moreover, the use of a relatively inexpensive cup and cone form of bearing making unnecessary the use of expensive precision bearings for this purpose. At the same time it provides a bearing which is capable of resilient yielding to absorb shocks to which the reel may be subjected, as for example, if one of the fly knives strikes a stone or other unyielding obstacle. This is very important in protecting the fly knives against permanent injury as a result of such shock.

To assure this result, the bearing surfaces are designed so that with the given axial pressure resulting from the deflection of the covers 28, the radial forces normally encountered during use will be less than sufficient to separate the bearing members 30 and 31; but the angular relation between them is such that with a substantially increased radial force an axial component results sufficient to overcome the resilient pressure of the covers 28 and thus to allow the reel to yield to the radial force.

In Fig. 3, I have shown a similar arrangement except that instead of the machined members 30 and 31, I have provided stampings 30b and 31b of suitable alloy steel or other metals capable of being hardened and polished to serve as bearing surfaces. These are stamped or spun into or secured to the parts 28 and 32 respectively as shown. In this case also the end of the reel shaft tube 32b may be case hardened to resist more effectively the action of the clutch rollers 37. The fact that the diameter of this surface is relatively large, however, makes the force exerted by these rollers relatively much less than in the clutches of much smaller diameter such as have been used heretofore; and if a high grade metal is used in the shaft tube, it may even be unnecessary to case harden.

Although I have found it desirable in all cases to use a relatively large diameter for the member 31 this is not essential to my invention; but it is advantageous even where a relatively small shaft is used in the reel, e. g., as shown in Fig. 4, that the end portion or member 31 should thus be of large diameter. In Fig. 4, the end member 31a is designed to engage the outside of the reel shaft portion 32a instead of the inside as in Figs. 1 to 3. This is an alternative not limited to the other features of this figure.

It will be understood also that although I have shown in Figs. 1 and 4 an engagement between the hardened member 31 and the reel shaft as a screw thread, it is not necessary that this or any other particular form be used. It is only necessary that the hardened portions, which cut into the softer shaft, should be capable of transmitting the necessary driving torque; and obviously, instead of this self-forming connection resulting from the use of a hardened end member which cuts its own engagement with the softer shaft portion, a machined or welded engagement or any other suitable engaging means may be used.

I have found it advantageous to use a large diameter tubular shaft in order that the bearing may be positioned within the shaft and thus more securely protected from the moisture and grit which might creep along the shaft even in spite of such sealing means as the washers 35 and 36. It is not essential, however, that the shaft itself be tubular; and, for example with the bearing member 31a, as shown in Fig. 4, the shaft may be solid, the enlarged end portion 31a being provided with a recessed or tubular end in which is the bearing surface, similarly protected from moisture and grit which may creep along the shaft.

What I claim is:

1. In a rotary reel mower the combination with the reel having a tubular axle, of a housing into which said axle projects, means for sealing the housing to the axle against passage of dust and water, a hardened member on the end of said tubular axle having a portion projecting into the tube with a sharp portion extending slightly beyond the inside radius of the tube implanted in the softer metal of the tube thereby giving mechanical engagement with the tube, said member having a recess in its end adapted to serve as one side of a ball-bearing race and an outer circular surface of which serves as one member of an over-running clutch, ball bearings in said race, a resilient sheet metal cover for said housing having a member thereon with a hard metal annular surface which parallels the surface of said recess and forms a complementary part of the ball-bearing race, said cover being formed tight against the housing and being resiliently sprung so that it exerts a resilient pressure on said bearing race member whereby to automatically take up play and wear in the bearing, a drive gear surrounding the outer clutch surface at the end of the reel axle, and provided with inner faces converging toward said clutch face and rollers therebetween to complete the over-running clutch, whereby said gear drives the reel in one direction only, and to hold said gear concentric with the shaft, a second gear meshing with and adapted to drive the first, a pivot for said second gear projecting into an opening in said cover, and means for clamping the cover to the housing; said cover having substantial lateral clearance with all adjacent parts excepting the pivot for said second gear, to which said cover is accurately fitted, whereby said cover, when released by said clamping means, may be adjusted arcuately about said pivot to raise or lower the respective end of the reel relative to said housing without affecting the meshing of said gears, and said clamping means being adapted to hold the adjustment during normal operation.

2. In a rotary reel mower, the combination with the reel having an axle, of a housing into which said axle projects, a portion near the end of said axle within the housing having a hard surface recess constituting a part of a bearing race and the outer surface of which end portion is the inner member of an over-running clutch, a resilient cover for said housing provided with a hard annular surface parallel to said recess and constituting a complementary part of the bearing race, rollers between said race parts and said bearing on their hard surfaces respectively, said cover being tight on said housing and sprung so that it exerts a resilient force on said bearing race which tends to tighten the race axially onto bearing rollers therein, a drive gear at said end of the reel axle, an over-running clutch between said gear and said reel axle which is constituted in part of the outer surface of said end portion and in part of the inner surface of said gear, whereby said reel axle may be driven by said gear in one direction only, a second gear meshing with and adapted to drive the first, a pivot for said second gear which projects into an opening in said cover, and means for clamping said cover to said housing, said cover having substantial lateral clearance with all parts except the pivot of the second gear to which it is accurately fitted whereby said cover may be adjusted arcuately about said pivot to raise or lower the respective end of the reel with respect to said housing without affecting the meshing of said gears.

3. In a rotary reel mower, the combination with the reel having an axle, of a housing into which said axle projects, a bearing in the end of the axle, a cover for said housing having thereon a complementary portion of said bearing adapted to carry the reel shaft and to determine its axial positioning, a drive gear coaxial with said shaft and adapted to engage it for transmission of torque, a second gear meshing with and adapted to drive the first, a pivot for said second gear extending into said cover and said cover being accurately fitted to said pivot but having substantial lateral clearance from other parts whereby it is capable of lateral movement only in an arc around said pivot to adjust the axial position of the reel, and means for clamping said cover in its adjusted position, whereby to determine the operating adjustment of the reel.

4. In a rotary reel mower, the combination with the reel having an axle, of a housing into which said axle projects, means for sealing the housing to the axle against passage of dust and water, a recess in the end portion of said axle, a bearing within said recess by which said reel is rotatably supported, and cooperating bearing means on the side of said housing opposite to that through which the axle projects and extending into said recess, whereby said bearing is effectively protected against moisture and dust.

5. In a rotary reel mower, the combination with the reel having an axle of stock shafting, a bearing at each end thereof including a member of hard metal having a smooth surface of accurate dimension for a bearing surface and another surface thereof coaxial with said bearing surface interfitting with the end of said shafting, and having projections harder than said shafting extending beyond the normal surface of said shafting and implanted in the softer metal of said shafting, establishing thereby a rigid connection without play due to clearance and capable of transmitting driving torque to the reel, and means for applying the torque for driving the reel through said member.

6. In a rotary reel mower, the combination with a reel axle, a bearing for rotatably supporting said axle and a housing enclosing said bearing, of a bearing portion secured to the end of said axle at the face of the housing toward the reel, and a washer compressed between said axle end and said bearing portion and projecting radially beyond both and close to said housing, whereby to throw off any dirt or water which might otherwise work along said shaft to said bearing.

7. The combination as defined in claim 4, in which the outer surface of the end portion of the axle is smooth and hard to form the engaged surface of an over-running clutch and the combination further includes drive mechanism including an annular member surrounding said outer surface and provided with at least one surface converging toward an area on the outer surface of said end portion, and at least one wedging drive member adapted to be engaged between said converging surfaces and crowded therebetween by relative movement between said converging surfaces.

RICHARD D. CLEMSON.